Dec. 16, 1941. G. C. WESTBY 2,266,137
PROCESS OF TREATING MANGANESE SILICATE ORES
Filed April 19, 1938
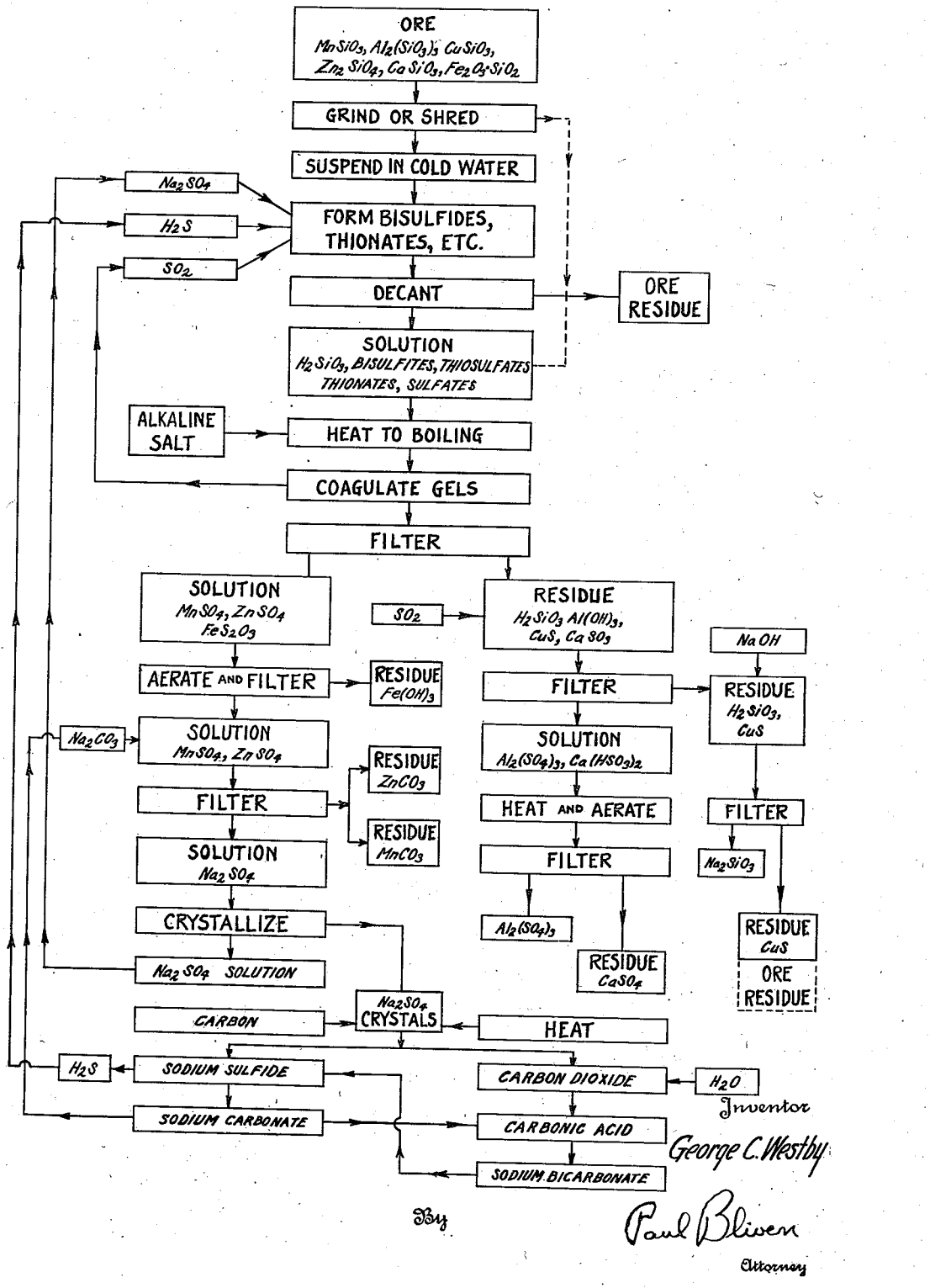

Patented Dec. 16, 1941

2,266,137

UNITED STATES PATENT OFFICE 2,266,137

PROCESS OF TREATING MANGANESE SILICATE ORES

George Cutler Westby, Seattle, Wash.

Application April 19, 1938, Serial No. 202,906

8 Claims. (Cl. 75—115)

The present invention relates to ores, and to their treatment with a high concentration of an active sulfur dioxide radical in order to place the metal constituents of the ore in solution as sulfur compounds.

The present invention also relates to the method of separating these various metal compounds.

The present invention also relates to the treating of silicate ores to remove the constituent silica therefrom.

The present invention also relates to the method of obtaining soluble sulfur compounds.

The principal ores which it is desired to treat are the manganese ores of the Olympic Peninsula of Washington. In these ores the manganese is found in both the divalent and quadrivalent condition and usually in combination with silica and oxygen. In addition to silica in chemical combination with the manganese, there are found various quantities of iron in the ferric and ferrous form, copper compounds and small amounts of aluminum, as well as calcium, in various combinations. Other ores which contain manganese and which it would be desirable to treat by means of the present process contain zinc and large quantities of aluminum. The present problem is not only to secure a pure manganese compound but to also effect a recovery in usable form of some of these other metals and non-metals.

In most of the ores the metals may be considered as oxides in combination with other elements. For example, manganese silicate, with the manganese in the divalent form, may be considered to consist of manganous oxide and silica. From their chemical reactions it may be seen that this view is a logical one to take, as many of the constituent metals of complex ore compounds, act as the oxides of the metals would.

It will be observed that herein the substances in a mixture are referred to as the components of the mixture, and that the elements that are chemically united in a compound are referred to as the constituents thereof. Also, distinction is made between the concepts of separating the components of a mixture and liberating the constituents of a compound.

Applicant knows of no successful method for treating silicate ores and in particular for treating manganese silicate ores. In the prior treatment of manganese ores and other ores, sulfur dioxide gas, as well as sulfuric acid, have been used.

The present invention distinguishes from this prior art in the perfection of a process for applying the active sulfur dioxide radical so that the process is much more rapidly carried forth, and so that ores not before susceptible of attack may now be treated.

Having in mind many of the defects of the prior art, it is an object of the present invention to rapidly and economically treat ores with the sulfur dioxide radical in a concentrated form.

It is an object of the present invention to treat ores high in combined silica to reduce or entirely liberate the constituent silica.

It is a further object of the present invention to treat manganese ores and, in particular, to liberate manganese from manganese silicate ore.

It is a further object of the present invention to treat ores containing iron and manganese to separate the iron and manganese and, in particular, to separate, liberate, and remove iron and manganese from silicate ores.

It is a further object of the present invention to treat ores containing copper, silica, aluminum, calcium, manganese, zinc, and iron, and to separate out of the ore compounds of these various elements.

The drawing shows a flow sheet which illustrates processes embodying features of the present invention, and which processes achieve the objects set forth above. In the drawing:

The solid lines of the flow sheet illustrates an exemplary process in which ore is added at one place only; in which manganese, aluminum, copper, zinc, calcium, and iron are present; in which a carrier solution of sodium sulfate is recirculated; and in which sulfur dioxide, sodium carbonate, and hydrogen sulfide are regenerated for reuse in the process.

The dotted lines of the flow sheet illustrate a modification of the process in which ore is added at two places; in which manganese, aluminum, copper, zinc, calcium, and iron are present; and in which part of the ore residue carries the copper.

In carrying out the present process, the ore should be first comminuted. The comminution of the ore may be achieved by grinding or by forming a molten slag and shredding with steam or liquid. If the ore is ground, the degree of comminution, or fineness, will be governed, first, by the necessity of obtaining a water suspension of the ore upon agitation, and second, by a balance between the cost of grinding and the time cost of treating the water suspension. If the ore is comminuted by forming and rapidly chilling the slag to form slag-wool, the hereinafter disclosed process will be more effectively and rapidly carried out, due not only to the fineness of the comminution but to the changed structure of the components, but once again the desirability of this alternative step of the process should be governed by the consideration of costs.

An important feature of the present invention resides in the realization that the concentration of an active sulfur dioxide radical, which may be obtained by passing sulfur dioxide into water, is very low in comparison with the concentration which may be obtained by the use of bisulfites, thiosulfates, and thionates, in which the sulfur dioxide is in combination as a supersaturated or loosely linked radical. By breaking down this loose linkage, large quantities of sulfur dioxide may be obtained in a nascent condition, ready for effective chemical reaction. The bisulfites are easily obtained as calcium or sodium bisulfite. These and other reactive salts may be generated as a step in the process.

This process may be performed by charging into water suspension a quantity of the comminuted ore which it is desired to treat. The suspension may be maintained by mechanical agitation. Into this water suspension is passed sulfur dioxide. The addition of sulfur dioxide is continued until all the metal or other elements present which it is desired to react with the sulfur dioxide are in combination as the sulfates or sulfites. Out of the presence of the raw ore, further additions of sulfur dioxide are continued along with the addition of free sulfur, preferably in the colloidal state, until these sulful compounds have been changed into the higher sulfur compounds. This may be done under pressure if desired. The addition of sulfur and sulfur dioxide is continued until the saturation point of the solution, resulting from the reaction of the sulfur and sulfur dioxide upon the ore, is approached. The proportion of the higher, that is the more complex, sulfur compounds in solution such as the bisulfites, the thiosulfates, and the thionates, as compared to the simple sulfites and sulfates in solution, is dependent on the temperature of the solution. As the higher sulfur compounds contain more loosely linked sulfur dioxide than the simpler sulfur compounds, and the higher compounds break down at high temperatures, it is desirable to keep the temperature of the suspension as low as possible. The concentration of the solution is dependent upon at least two considerations. A too concentrated suspension of the resulting colloidal silicic acid will cause it to form a gel. Also, the amount of water will vary somewhat, depending upon whether the manganese is in the divalent or quadrivalent form, more water being required for the former to minimize the precipitation of sulfites. No more water should be used than is necessary, in order that the solution may be as concentrated as possible and for other reasons, as will hereinafter appear.

Portions or all of the resulting solution, including the colloids, are decanted or filtered and led to another treatment tank, into which a definite amount of comminuted ore is placed in suspension. Upon heating this concentrated solution, nascent sulfur dioxide will be released to act upon the ore, and to take into solution the metals and other components of the ore. If the residue from the ore charged into the second tank, still contains desirable elements after this treatment, it may be charged back into the first treatment tank, where it will be further acted upon. The resultant solutions and colloidal suspensions in the second tank may then be taken off and treated in various ways to separate out the compounds present therein. The above procedure will hereinafter be referred to as "the process."

The process may be applied to various ores, either those with several metallic elements or with only one metallic element. Also in treating an ore with several elements, it may be desirable to separate and save a plurality of the elements. The process will be first described in connection with the treatment of an ore from which it is desired to recover only the manganese.

Usually in combination with the manganese or with other elements present in the ore, will be found other substances which will be placed in solution along with the manganese, when subjected to the process. Such other compounds are copper oxide, combined or uncombined, combined silica, aluminum oxide, calcium oxide, iron oxide and zinc oxide. These simple compounds often are combined to form complex compounds. If the process is carried out on an ore having these compounds present, they will be found in solution as higher sulfur compounds. When the resulting solution is brought to the boiling point, there will be left in solution only compounds of manganese, iron and zinc. Some of the manganese and iron may also be precipitated. In carrying out the process manganous and ferrous oxides tend to form insoluble sulfites. This may be remedied by increasing the concentration of the sulfur dioxide radical so that there will be formed a bisulfite, and then in the presence of free sulfur a continuation of the treatment will form the thiosulfate. The sulfate and the thiosulfate of manganese and iron are stable compounds that will not break down in boiling water. The sulfate and the dithionate rapidly forms from the treatment of manganese dioxide. Also the formation of the insoluble manganese and iron sulfites may be remedied by passing air through wet or a water suspension of the sulfites in order to oxidize them to sulfates. If the solution contains other compounds such as aluminum sulfite which if oxidized to the sulfate would be difficult to selectively precipitate, it is desirable that this oxidation of the insoluble sulfites should not be performed until after the solution has been thoroughly heated to precipitate these other compounds in a form not affected by the oxygenation, after which the oxidization is carried out on the precipitate only. The aeration of a manganese, zinc, and iron solution will increase the solubility of the manganese sulfite, in the form of the sulfate, and precipitate the iron in its basic form.

In a solution of manganese and zinc obtained by this process, after aeration most of the manganese and zinc will be in the form of the sulfate. The addition of equivalent amounts of sodium carbonate with respect to the zinc present, will cause the precipitation of the zinc as the carbonate and leave the manganese in solution. Any manganese precipitated as the carbonate will react with the zinc sulfate to precipitate the zinc as the carbonate. Manganese carbonate in equivalent amounts may also be used to precipitate the zinc. Further additions of sodium carbonate will precipitate the manganese as the carbonate.

In the performance of the process on an ore containing copper, silica, aluminum, and calcium, as well as manganese, iron, and zinc these elements will be found in solution as the sulfates and the higher sulfur compounds, with the exception of the silica, which will be in the colloidal form as silicic acid. When the solution is heated to about 80° C. or over, it will be found that the copper present will be precipitated as a sulfide, the silicic acid will begin to coagulate as a gel, the aluminum will precipitate as the hydroxide, and the calcium as the sulfite. Boiling the solution will complete the precipitation of these compounds and their separation from the solution containing the manganese, iron and zinc. In addition to boiling, the solution may be treated with an alkaline salt such as lime to reduce the hydrogen ion concentration and to obtain neutralization of the solution. The lime also acts to coagulate the gel.

If manganese sulfite and iron sulfite are precipitated with aluminum sulfite which decomposes, they may again be placed in solution by treating with sulfur dioxide and excess sulfur until the manganese and iron form the thiosulfates. Upon heating this solution the aluminum will be precipitated as the hydroxide. The aluminum sulfite readily changes to aluminum hydroxide in the presence of water. If any iron or manganese comes down with the aluminum hydroxide they may then be oxidized to the sulfate when they will remain in solution. The aluminum hydroxide will not be affected.

If these precipitants are again placed in water suspension and treated with the sulfur dioxide radical, it will be found that the copper sulfide and the silicic acid gel remain in their precipitated condition, while the aluminum hydroxide will pass into solution as the sulfite or the sulfate and the calcium as the bisulfite. In this instance the best form of the sulfur dioxide would be the gas as the supersaturated salt would give undesired precipitates.

The copper sulfide may be separated from the silicic acid by redissolving the silicic acid with sodium hydroxide to form sodium silicate.

The calcium may be precipitated out of the solution separated from the copper and silicic acid precipitants, by heating and aerating.

In the treatment of ores containing aluminum, in carrying out the process, it is desirable that there be present free sulfur in order that the thiosulfate will be formed. When the solution is heated to precipitate the hydroxide, there must be present certain compounds as iron, or calcium, or sodium thiosulfate in order that the aluminum will precipitate as the hydroxide.

If in the original ore there is silica as a component thereof, this silica will not be acted upon by the present process, but will be found in the ore residue except when comminuted by means of furnacing and blowing of the molten jet.

In order to precipitate copper as copper sulfide, as outlined above, the heating of the solution should be carried on in the presence of a thionate or thiosulfate in order that the copper may be reduced to the sulfide.

In precipitating the manganese sulfate with sodium carbonate, there is formed a solution of sodium sulfate. The sodium sulfate may be recovered from this solution by increasing the concentration of this solution to its saturation point and then cooling the solution to crystallize out a portion of the sodium sulfate. The concentration may be increased by evaporation or by using the solution to obtain the original water suspension of the ore. This later may be done because even if the water is saturated with sodium sulfate, it will still dissolve manganese sulfate without the precipitation of either compound.

In the above specification and in the claims appended hereto, when the word "the" is used as a definitive of an element or a compound, it is intended to be definitive only to the extent ordinarily possible upon performance of the process as set forth herein. That is when it is said that "the metal is removed" or that "the soluble and the insoluble compounds are separated," it is not meant that necessarily one hundred percent of the metal is removed or of the compound is separated out. The degree of completion of the process or any of its steps must of a necessity be governed by the inherent physical limitations of the process and of the economic facts attendant upon its performance.

In the above specification and in the claims appended hereto, the word "solution" has been used to cover both a solution containing a single solute and a plurality of solutes, as well as a colloid in suspension in a solution. Such usage has been for the purpose of brevity in expression. The full meaning and coverage of the term being apparent from the context. Also, the word "solute" has been used to designate a colloid which might be in suspension.

As previously stated it is desirable in certain steps of the process that a thiosulfate be present. Sodium sulfide may be easily built into the thiosulfate by the addition of sulfur dioxide. This may be done by adding the sodium sulfide to the ore suspension being treated by the process. The sodium sulfide is readily obtained by heating and reducing the crystalized sodium sulfate with carbon.

Colloidal sulfur for use in the process may be obtained by passing hydrogen sulfide into the ore suspension or resulting solution along with the sulfur dioxide, as the two react to give colloidal sulfur. Some pentathionic acid may also be formed, which upon heating will break down to give active reagents. The hydrogen sulfide may be obtained by treating sodium sulfide, obtained as above set forth, with sodium bicarbonate, with the production also of sodium carbonate. The bicarbonate is easily produced by passing carbon dioxide into a water suspension of sodium carbonate. The production of the hydrogen sulfide also acts to regenerate the sodium carbonate to be used in precipitating the manganese.

Having thus described my invention, I claim:

1. The process of treating manganese ore, comprising: placing manganese ore in suspension in a solution containing sodium sulfate and an active sulfur dioxide radical, which will cause manganese to enter into solution as a sulfur compound, precipitating said manganese from said solution with sodium carbonate whereby the concentration of sodium sulfate will be increased, recirculating said sodium sulfate solution to again hold in suspension freshly charged ore, repeating the above steps until said solution is saturated with sodium sulfate, and partially crystallizing out said sodium sulfate by reducing the temperature of said saturated solution.

2. The process of treating manganese ore, comprising: placing manganese ore in suspension in a solution containing sodium sulfate and an active sulfur dioxide radical, which will cause manganese in said ore to enter into solution as a sulfur compound, precipitating said manganese from said solution with sodium carbonate whereby the concentration of sodium sulfate in solution will be increased, recirculating said sodium sulfate solution to again hold in suspension freshly charged ore, repeating the above steps until said solution is saturated with sodium sulfate, partially crystallizing out said sodium sulfate by reducing the temperature of said saturated solution, and adding the solution remaining from the crystallization to the recirculating sodium sulfate solution.

3. The process of treating a metallic compound, comprising: treating said compound with sulfur dioxide and sulfur; precipitating a compound of the metal and obtaining a sulfate; reducing the sulfate and treating with an acid to obtain hydrogen sulfide; and obtaining the sulfur above mentioned by interacting sulfur dioxide and said hydrogen sulfide.

4. The process of treating a metallic compound with a higher sulfur compound, comprising: placing said metallic compound in water suspension, placing in said suspension a sulfide and passing into said suspension sulfur dioxide to form with the sulfide a higher sulfur compound, interacting said metallic compound with said higher sulfur compound, precipitating a compound of said metal and obtaining a sulfate, and reducing the sulfate to obtain a sulfide that may be used as above.

5. The process of treating silicate ore, comprising: comminuting said ore; placing said ore in water suspension; and subjecting said ore to the action of active sulfur dioxide radicles and free sulfur until the metal in said ore is in combination with said sulfur dioxide and said sulfur, and in solution.

6. The process of treating manganese silicate ore, comprising: comminuting manganese silicate ore, and placing said ore in water suspension; subjecting said ore to the action of active sulphur dioxide radicles and free sulfur until the manganese in said ore is in combination with said sulfur dioxide and said sulfur and in solution.

7. The process of treating manganese silicate ore, comprising; comminuting manganese silicate ore; placing said ore in cold water suspension; subjecting said ore to the action of active sulfur dioxide radicles and free sulfur until the manganese in said ore is in combination with said sulfur dioxide and said sulfur, and in solution; and heating and aerating the solution in separate successive steps to obtain at each step, elimination of other compounds than manganese compounds.

8. The process of treating manganese silicate ore, comprising comminuting manganese silicate ore; placing said ore in cold water suspension; subjecting said ore to the action of active sulfur dioxide radicles and free sulfur until the manganese in said ore is in combination with said sulfur dioxide and said sulfur, and in solution; heating the solution to the boiling point; and after heating aerating the solution to obtain elimination of other compounds than manganese compounds.

GEORGE CUTLER WESTBY.